(12) United States Patent
Chen et al.

(10) Patent No.: US 7,418,609 B2
(45) Date of Patent: Aug. 26, 2008

(54) METHOD FOR INSTANT ON MULTIMEDIA PLAYING

(75) Inventors: Yi-Chang Chen, Taipei (TW); Chih-Chien Liu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 409 days.

(21) Appl. No.: 11/307,393

(22) Filed: Feb. 6, 2006

(65) Prior Publication Data

US 2007/0022308 A1 Jan. 25, 2007

(30) Foreign Application Priority Data

Jul. 19, 2005 (TW) .............................. 94124274 A

(51) Int. Cl.
*G06F 1/32* (2006.01)
(52) U.S. Cl. ...................... 713/320; 713/300
(58) Field of Classification Search ........................ None
See application file for complete search history.

(56) References Cited

U.S. PATENT DOCUMENTS 6,240,521 B1 * 5/2001 Barber et al. ............... 713/323
6,279,056 B1 * 8/2001 Jacobs et al. ................. 710/48
6,279,506 B1   8/2001 Jurgensen et al. ........... 118/730
2002/0085835 A1 * 7/2002 Zhang et al. ................ 386/124
2002/0178390 A1 * 11/2002 Lee ............................ 713/320

\* cited by examiner

*Primary Examiner*—Dennis M Butler
(74) *Attorney, Agent, or Firm*—Jianq Chyun IP Office

(57) ABSTRACT

A method for instant on multimedia playing is provided, which enables a computer to selectively enter an operation mode of an IOMP (Instant On Multimedia Player) program when it enters a power conservation mode. First, a computer system stays in the power conservation mode, until an IOMP activating signal has been received. Next, the computer system saves the hardware information of the computer into a memory. And then a processor of the computer reads an IOMP program from another memory and executes the IOMP program to produce and display a human-computer interface menu, which is provided for users to select files for playing. Next, the processor executes the IOMP program to play the files selected previously. Finally, upon the receipt of a recovery instruction, the computer system saves the hardware information back into the computer to recover the computer to the power conservation mode.

29 Claims, 2 Drawing Sheets

METHOD FOR INSTANT ON MULTIMEDIA PLAYING

CROSS-REFERENCE TO RELATED APPLICATION

This application claims the priority benefit of Taiwan application serial no. 94124274, filed on Jul. 19, 2005. All disclosure of the Taiwan application is incorporated herein by reference.

BACKGROUND OF THE INVENTION

1. Field of Invention

The present invention relates to a method for multimedia playing. More particularly, the present invention relates to a method for instant on multimedia playing.

2. Description of Related Art

The techniques of directly playing audio CDs by notebook computers have been disclosed in U.S. Pat. No. 6,279,506 "Computer system capable of playing audio CDs in CD-ROM drive independent of an operating system". However, with the conventional techniques, the function of playing the audio CDs can only be performed when the hardware design of the notebook computer has been modified extensively. Additionally, in the conventional techniques, the program for playing the audio CDs, which is stored in a read only memory (ROM), shares the memory map space with the basic input/output system read only memory (BIOS ROM). The method disclosed in U.S. Pat. No. 6,279,506 uses the ROM solely for the program playing the audio CDs. And the program can play only audio CDs. In addition, the memory map space of the BIOS ROM has a limited memory space. If playback of other types of multimedia CDs, such as digital versatile discs (DVDs), is implemented with the techniques disclosed in U.S. Pat. No. 6,279,506, the size of the playback program would be larger than the shared memory map space of the BIOS ROM. This is an obvious defect of U.S. Pat. No. 6,279,506.

Additionally, when playing multimedia CDs in the environment of a traditional windows operating system, such as the Microsoft Windows operating system, all the hardware resources of a notebook computer are usually activated. Therefore, when the user is watching a multimedia program, hardware of the notebook computer irrelevant to the playing of multimedia CDs is also consuming electric power, causing unnecessary power waste and shortening the time available to the user for watching multimedia programs.

Additionally, the U.S. Pat. No. 6,279,506 does not disclose how to enable the computer to play multimedia in an operating system, such as the Microsoft Windows operating system, when the computer enters a stand-by mode (S3) or a sleep mode (S4).

In view that the defects of the conventional techniques described above have to be improved, the inventor of this application proposes a method for instant on multimedia playing and a computer that implements the method to solve the defects of the conventional techniques.

SUMMARY OF THE INVENTION

The main object of the present invention is to provide a method for instant on multimedia playing, wherein the multimedia is played when the computer enters a power conservation mode, such as a stand-by mode or a sleep mode.

In order to achieve the aforementioned object of the present invention, the present invention provides a method for instant on multimedia playing, which is applied in a computer and enables the computer to selectively enter an operation mode of an IOMP (Instant On Multimedia Player) program when the computer enters a power conservation mode, such as a stand-by mode or a sleep mode. The method comprises the following steps. (A) A computer system checks whether an IOMP activating signal is received when the computer enters the power conservation mode, such as a stand-by mode or a sleep mode, if the signal is received then proceed to step (B), otherwise the computer remains in the power conservation mode. (B) The computer system stores a hardware information of the computer into a first memory. (C) A processor of the computer reads an IOMP program from a second memory and executes the IOMP program. (D) The processor executes the IOMP program to produce and display a human-computer interface menu, wherein the human-computer interface menu is provided to the user for selecting the files to be played. (E) The processor executes the IOMP program to play the files selected in step (D). (F) While performing step (E), the computer system simultaneously detects whether a recovery instruction is received at any moment, if the recovery instruction is received then the computer system reads the hardware information of step (B) from the first memory and stores the hardware information back into the computer to recover the computer to the power conservation mode.

In order to the make those skilled in the art understand the objects, features and advantages of the present invention, detailed embodiments accompanied with the drawings are described in detail below.

DESCRIPTION OF EMBODIMENTS

Figure 1:
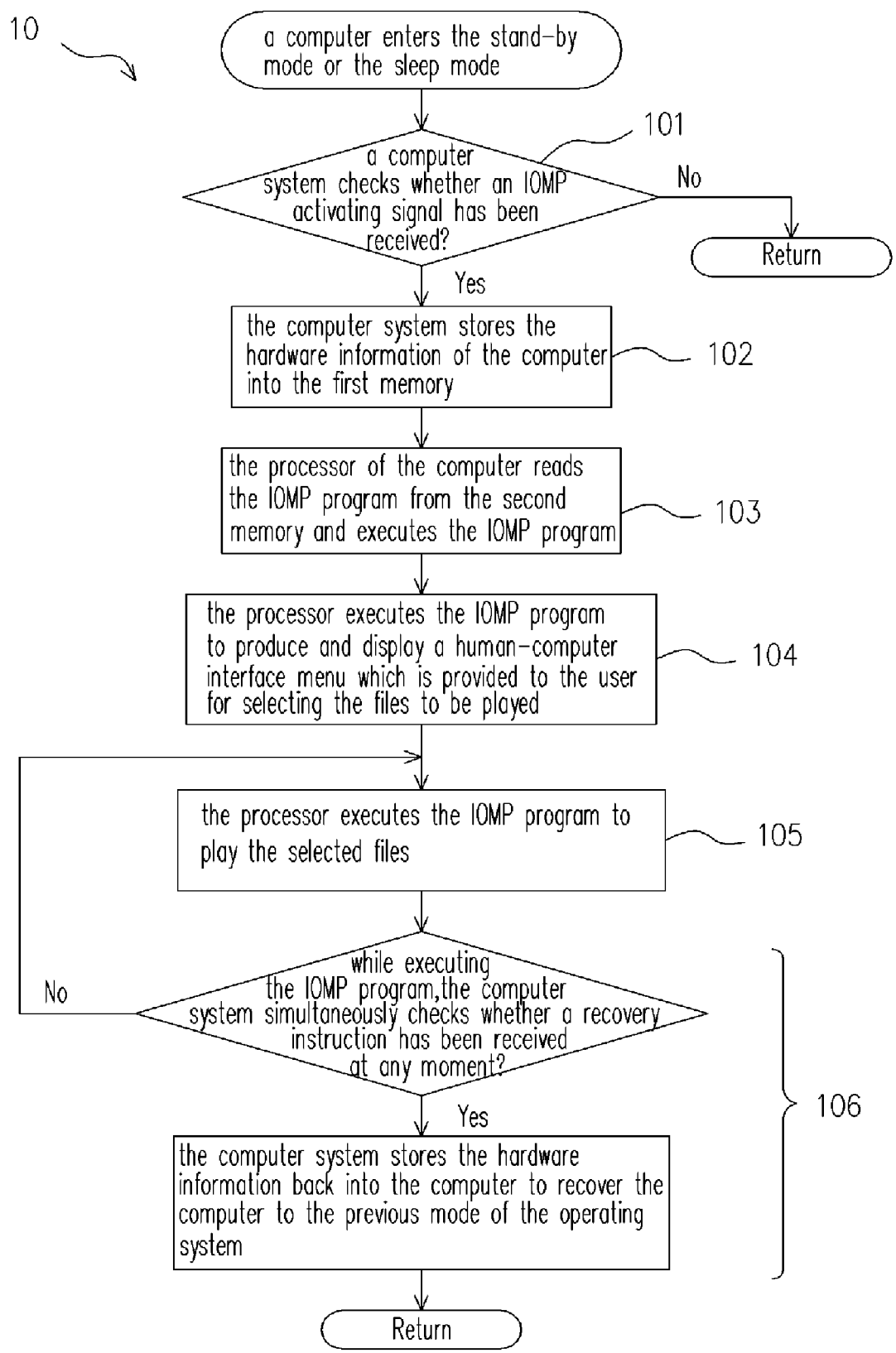
FIG. 1 is a flow chart of a method according to the present invention.
Figure 2:
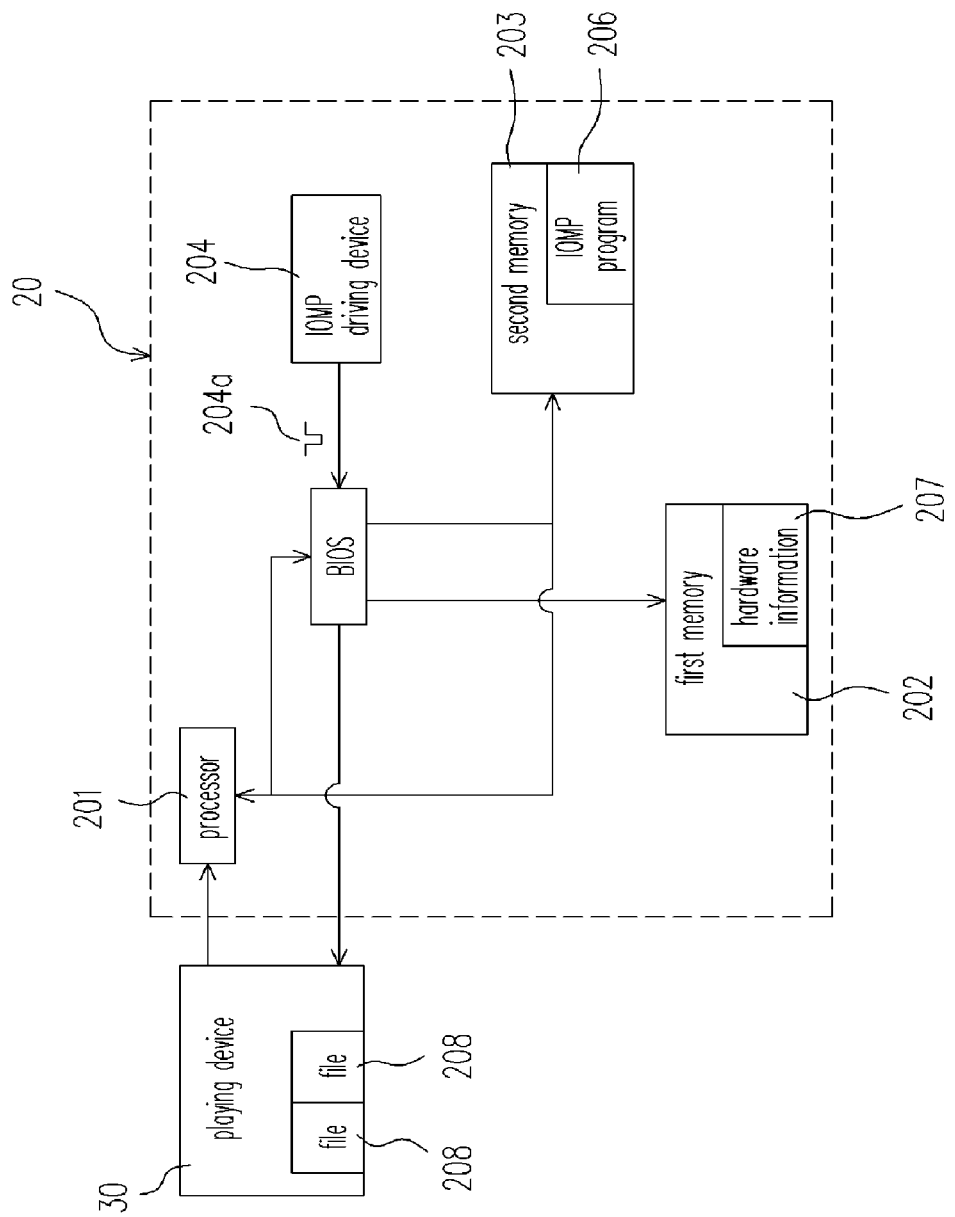
FIG. 2 is a schematic diagram illustrating the hardware architecture of a computer implementing the method of the present invention.

Please refer to FIG. 1 and FIG. 2. FIG. 1 illustrates a flow chart of a method according to the present invention. FIG. 2 is schematic diagram illustrating the hardware architecture of the computer implementing the method of the present invention. The method 10 for instant on multimedia playing (IOMP) according to the present invention mainly features that a computer running an operating system, such as the Microsoft Windows operating system, can determine to enter the operating mode of the IOMP program or not based on the presence of an IOMP activating signal 204a when the computer enters a power conservation mode, such as a standby (S3) or a suspend (S4) mode. The method 10 of the present invention comprises steps 101-106 that are discussed below. In step (101), a computer system 20 checks whether the IOMP activating signal 204a bas been received when the computer enters the power conservation mode, such as the standby (S3) mode or the suspend (S4) mode. If the computer system 20 confirms the receipt of the IOMP activating signal 204a, the flow of the method goes to step (102). Otherwise, the computer remains in the power conservation mode. The IOMP activating signal 204a described above is generated by an IOMP driving device 204. For example, the IOMP driving device 204 may be a specific key on the keyboard and may generate the IOMP activating signal 204a when being pressed. The signal 204a may be received through the BIOS 205.

In step (102), the computer system 20 saves the hardware information 207 of the computer in a first memory 202, wherein the first memory 202 may be a hard disk, a flash memory, a read-only memory (ROM), a complementary metal-oxide semiconductor memory (CMOS memory), or a memory card. The hardware information 207 of the computer contains the data of a chipset. The computer at this moment has entered the IOMP activated mode, and can enter the IOMP operation mode via the stand-by mode (S3) or the sleep mode (S4). According to the mode via which the computer enters the IOMP operation mode, the computer system 20 determines which ones among the data of the internal registers of the chipset, the data of the internal registers of the processor 201, the compressed data of the main memory, and other related information for completely maintaining the stand-by mode (S3) or the sleep mode (S4), and so on, are chosen as the hardware information 207 to be saved in the first memory 202. If the power conservation mode into which the computer entered is the stand-by mode (S3) and when the BIOS 205 receives the push-button signal 204a, the computer system 20 firstly saves the data of the chipset in the computer in the main memory of the computer system 20 (not shown in FIG. 2). In the next step, the computer system 20 saves the contents of the main memory as the hardware information 207 in the first memory 202. If the power conservation mode into which the computer entered is the sleep mode (S4) and when the BIOS 205 receives the push-button signal 204a, the computer system 20 firstly save the data of the chipset in the computer as hardware information 207 in the first memory 202. In step (103), the processor 201 of the computer reads the IOMP program 206 from the second memory 203 and executes the IOMP program 206, wherein the second memory may be a hard disk, a flash memory, a read only memory, a CMOS memory or a memory card. The IOMP program 206 is stored in the second memory 203, and the IOMP program 206 of the present invention can be implemented by referring to related arts about conventional multimedia playback programs. According to various product designs or demands of users, the IOMP program 206 and the computer hardware information can be stored in the same memory, wherein the memory may be a hard disk, a flash memory, a read only memory or a memory card.

In step (104), the processor 201 executes the IOMP program 206 to generate and display a human-computer interface menu for the user to select files for playing. The IOMP program 206 calls the BIOS 205 to access the playing device 30 in order to present all files as menu options to the user for selection. The user can input his/her selection via a keyboard or a mouse to select files for playing. The playing device 30 may be a CD-ROM drive, a hard disk drive or a memory card, etc. As the products vary, users can also use the human-computer interface menu to select the playing device to be driven, and then select the files saved in the selected playing device for playing. In step (105), the processor 201 executes the IOMP program 206 to play the files selected in step (104). At this time, the IOMP program 206 plays the selected files according to their file formats, such as the MP3 format, the DVD video format, the MPEG4 format, etc., so that the user can watch movies or listen to music.

In step (106), the computer system 20 checks whether a recovery instruction has been received while executing step (105). Upon confirming the receipt of such a recovery instruction, the computer system 20 stops executing the IOMP program 206, and saves the hardware information 207 that is saved in the first memory 202 in step (102) into the computer to recover the computer to the power conservation mode. According to different power conservation mode before the entry of the computer into the IOMP play mode, if the power conservation mode is the stand-by mode (S3), the computer system 20 in step (106) firstly recovers the contents of the main memory from the first memory 202 into the main memory, and then restores the hardware information 207 from the main memory back into the computer system. If the power conservation mode is the sleep mode (S4), in step (106), the computer system directly stores the hardware information 207 from the first memory 202 back into the computer. The recovery instruction mentioned above may be implemented by a specific button. For example, a recovery button may be set up on the keyboard. When the user wishes to stop execution of the IOMP program 206 and to resume the previous operation mode of the operating system, the user only needs to press the recovery button. Immediately after receiving the signal of the recovery button, the computer system 20 stops execution of the IOMP program and completely restores the computer to the power conservation mode. The mode to which the computer is restored may be the stand-by mode or the sleep mode, depending on the mode from which the computer enters the operation mode of the IOMP program.

The computer according to the present invention may be a notebook computer, a tablet computer, a portable computer, a handheld computer, a desktop computer, and so on.

Those skilled in the art will understand that various different modifications can be made without departing from the spirit and scope of the present invention and the present invention cover any modifications and variations within the scope of the following claims and their equivalents.

What is claimed is:

1. A method for instant on multimedia playing, applied to a computer, enabling the computer to selectively enter an IOMP (Instant On Multimedia Player) operation mode when it enters a power conservation mode, wherein the method comprises the following steps:

A) a computer system checking whether an activating signal of an IOMP program has been received when the computer enters the power conservation mode, and going to the step B upon confirming the receipt of the activating signal, otherwise, the computer remaining in the power conservation mode;

B) the computer system saving a hardware information of the computer in a first memory;

C) a processor of the computer reading an IOMP program from a second memory and executing the IOMP program;

D) the processor executing the IOMP program to generate and display a human-computer interface menu, wherein the interface menu is provided for users to select files for playing;

E) the processor executing the IOMP program to play the files selected in step (D);

F) the computer system, while executing step E, checking whether a recovery instruction has been received and stops execution of the IOMP program upon confirming the receipt of the recovery instruction, and then reading the hardware information of step B from the first memory and saving the hardware information back into the computer to recover the computer to the power conservation mode.

2. The method according to claim 1, wherein the power conservation mode is a stand-by mode (S3).

3. The method according to claim 1, wherein the power conservation mode is a sleep mode (S4).

4. The method according to claim 2, wherein the hardware information contains the contents of a memory when the power conservation mode is the stand-by mode.

5. The method according to claim 1, wherein the computer is one of a notebook computer, a tablet computer, a portable computer, a handheld computer and a desktop computer.

6. The method according to claim 1, wherein the computer further includes a playing device and the computer system can call the playing device to access the contents of the files recited in step D.

7. The method according to claim 6, wherein the playing device is one of a CD-ROM drive, a hard disk drive and a memory card.

8. The method according to claim 1, wherein the second memory is one of a flash memory, a hard disk, a read only memory and a memory card.

9. The method according to claim 1, wherein the first memory is one of a flash memory, a hard disk, a read only memory and a memory card.

10. The method according to claim 1, wherein the hardware information includes the data of an internal register of the processor.

11. A method for instant on multimedia playing, used in a computer, enabling the computer to selectively enter an IOMP operation mode when the computer enters a power conservation mode, wherein the method comprises the following steps:
   A) a computer system checking whether an activating signal of an IOMP program has been received when the computer enters the power conservation mode, and going to Step B upon confirming the receipt of the activating signal, otherwise the computer remaining in the power conservation mode;
   B) the computer system saving a hardware information of the computer into a memory;
   C) a processor of the computer reading an IOMP program from the memory and executing the IOMP program;
   D) the processor executing the IOMP program to generate and display a human-computer interface menu, wherein the interface menu is provided for users to select files for playing;
   E) the processor executing the IOMP program to play the files selected in step D;
   F) the computer system, while executing step E, checking whether a recovery instruction has been received and stops the execution of the IOMP program upon confirming the receipt of the recovery instruction, and then reading the hardware information of step (B) from the memory and saving the hardware information back into the computer to recover the computer to the power conservation mode.

12. The method according to claim 11, wherein the power conservation mode is a stand-by mode (S3).

13. The method according to claim 11, wherein the power conservation mode is a sleep mode (S4).

14. The method according to claim 11, wherein the memory is one of a flash memory, a hard disk, a read only memory and a memory card.

15. The method according to claim 11, wherein the computer is one of a notebook computer, a tablet computer, a portable computer, a handheld computer and a desktop computer.

16. The method according to claim 11, wherein the computer further includes a playing device that is one of a CD-ROM drive, a hard disk drive and a memory card.

17. A method for instant on multimedia playing, used in a computer, enabling the computer to selectively enter an IOMP operation mode when the computer enters a stand-by mode, wherein the method comprises the following steps:
   A) a computer system checking whether an activating signal of an IOMP program has been received when the computer enters the stand-by mode, and going to the step B upon confirming the receipt of the signal, otherwise, the computer remaining in the stand-by mode;
   B) the computer system saving a hardware information of the computer into a first memory;
   C) the computer system saving the contents of the first memory into a second memory;
   D) a processor of the computer reading an IOMP program from a third memory and executing the IOMP program;
   E) the processor executing the IOMP program to generate and display a human-computer interface menu, wherein the interface menu is provided for users to select files for playing;
   F) the processor executing the IOMP program to play the files selected in step E;
   G) the computer system, while executing step F, checking whether a recovery instruction has been received and stops the execution of the IOMP program upon confirming the receipt of the recovery instruction, and then reading the contents of the first memory of step C from the second memory and saving the contents back into the first memory; and
   H) saving the hardware information from the first memory back into the computer to recover the computer to the power conservation mode.

18. The method according to claim 17, wherein the hardware information contains the data in a chipset when the power conservation mode is the stand-by mode.

19. The method according to claim 17, wherein the computer further includes a playing device and the computer system can call the playing device to access the contents of the files of step E.

20. The method according to claim 19, wherein the playing device is one of a CD-ROM drive, a hard disk drive and a memory card.

21. The method according to claim 17, wherein the second memory is one of a flash memory, a hard disk, a read only memory and a memory card.

22. The method according to claim 17, wherein the first memory is a main memory in the computer system.

23. The method according to claim 17, wherein the third memory is one of a flash memory, a hard disk, a read only memory and a memory card.

24. A method for instant on multimedia playing, used in a computer, enabling the computer to selectively enter an IOMP operation mode when the computer enters a stand-by mode, wherein the method comprises the following steps:
   A) a computer system checking whether an activating signal of an IOMP program has been received when the computer enters the stand-by mode, and going to the step B upon confirming the receipt of the signal, otherwise, the computer remaining in the stand-by mode;
   B) the computer system saving a hardware information of the computer into a first memory;
   C) the computer system saving the contents of the first memory into a second memory;
   D) a processor of the computer reading an IOMP program from a second memory and executing the IOMP program;
   E) the processor executing the IOMP program to generate and display a human-computer interface menu, wherein the interface menu is provided for users to select files for playing;

F) the processor executing the IOMP program to play the files selected in step (E);

G) the computer system, while executing step F, checking whether a recovery instruction has been received and stops the execution of the IOMP program upon confirming the receipt of the recovery instruction, and then reading the contents of the first memory of step C from the second memory and saving the contents back into the first memory; and (H) saving the hardware information from the first memory back into the computer to recover the computer to the power conservation mode.

25. The method according to claim 24, wherein the hardware information contains the data of a chipset.

26. The method according to claim 24, wherein the computer further comprises a playing device and the computer system can call the playing device to access the contents of the files of step (E).

27. The method according to claim 26, wherein the playing device is one of a CD-ROM drive, a hard disk drive and a memory card.

28. The method according to claim 24, wherein the second memory is one of a flash memory, a hard disk, a read only memory and a memory card.

29. The method according to claim 24, wherein the first memory is a main memory in the computer system.

* * * * *